United States Patent [19]

DeMonbrun et al.

[11] 3,989,608

[45] Nov. 2, 1976

[54] FLOTATION PROCESS FOR REMOVAL OF PRECIPITATES FROM ELECTROCHEMICAL CHROMATE REDUCTION UNIT

[75] Inventors: James R. DeMonbrun, Knoxville; Charles R. Schmitt; Everett H. Williams, both of Oak Ridge, all of Tenn.

[73] Assignee: The United States of America as represented by the United States Energy Research and Development Administration, Washington, D.C.

[22] Filed: Dec. 30, 1975

[21] Appl. No.: 645,167

[52] U.S. Cl. ............................. 204/149; 204/130; 204/152; 210/44
[51] Int. Cl.² ..................... C25B 1/02; C25B 1/04
[58] Field of Search ........... 204/149, 130, 152, 278, 204/129; 210/44

[56] References Cited
UNITED STATES PATENTS

| | | | |
|---|---|---|---|
| 478,048 | 6/1892 | Collins | 204/149 X |
| 820,482 | 5/1906 | Dion | 204/276 X |
| 2,997,430 | 8/1961 | Foyn | 204/151 |
| 3,222,269 | 12/1965 | Stanton | 204/129 X |
| 3,505,188 | 4/1970 | Pan | 204/149 |
| 3,523,891 | 8/1970 | Mehl | 204/149 X |

*Primary Examiner*—John H. Mack
*Assistant Examiner*—A. C. Prescott
*Attorney, Agent, or Firm*—Dean E. Carlson; David S. Zachry; Fred O. Lewis

[57] ABSTRACT

This invention is an improved form of a conventional electrochemical process for removing hexavalent chromium or other metal-ion contaminants from cooling-tower blowdown water. In the conventional process, the contaminant is reduced and precipitated at an iron anode, thus forming a mixed precipitate of iron and chromium hydroxides, while hydrogen being evolved copiously at a cathode is vented from the electrochemical cell. In the conventional process, subsequent separation of the fine precipitate has proved to be difficult and inefficient.

In accordance with this invention, the electrochemical operation is conducted in a novel manner permitting a much more efficient and less expensive precipitate-recovery operation. That is, the electrochemical operation is conducted under an evolved-hydrogen partial pressure exceeding atmospheric pressure. As a result, most of the evolved hydrogen is entrained as bubbles in the blowdown in the cell. The resulting hydrogen-rich blowdown is introduced to a vented chamber, where the entrained hydrogen combines with the precipitate to form a froth which can be separated by conventional techniques. In addition to the hydrogen, two materials present in most blowdown act as flotation promoters for the precipitate. These are (1) air, with which the blowdown water becomes saturated in the course of normal cooling-tower operation, and (2) surfactants which commonly are added to cooling-tower recirculating-water systems to inhibit the growth of certain organisms or prevent the deposition of insoluble particulates.

8 Claims, 1 Drawing Figure

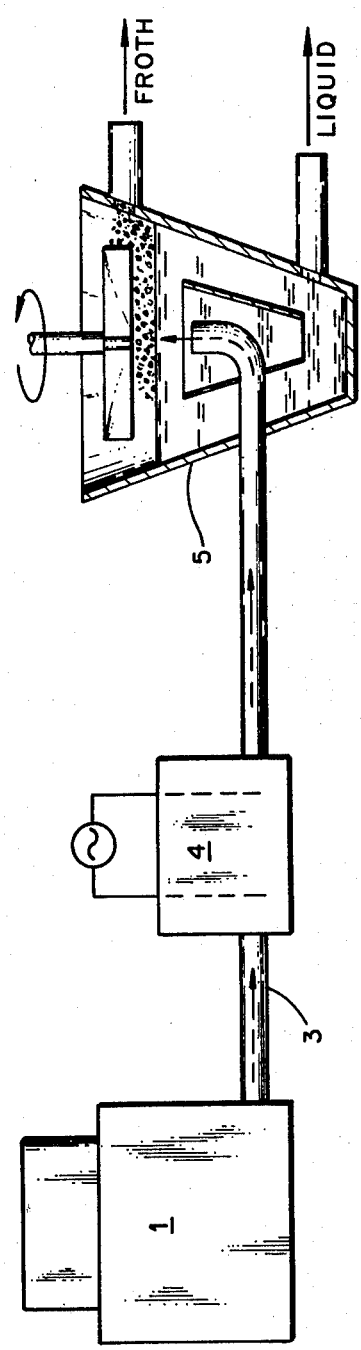

FLOTATION PROCESS FOR REMOVAL OF PRECIPITATES FROM ELECTROCHEMICAL CHROMATE REDUCTION UNIT

BACKGROUND OF THE INVENTION

This invention relates broadly to electrochemical process for the removal of metal-ion contaminants from aqueous media, and more particularly to improvements in a process wherein such contaminants are reduced and precipitated at an iron anode. This invention was made in the course of, or under, a contract with the United States Energy Research and Development Administration.

In a conventional process for the removal of metal-ion radical contaminants from an aqueous medium, the contaminant-containing medium is passed continuously through an electrochemical cell on a once-through basis. The cell contains a sacrificial iron anode for effecting reduction and precipitation of a mixed-hydroxide precipitate containing the contaminants. Where, for example, the contaminant is hexavalent chromium in the form of chromate or dichromate, a mixture of chromium hydroxide and iron hydroxide is precipitated at the anode, whereas gaseous hydrogen is evolved at the cathode. The mixed precipitate typically consists of very small particles which are suspended in the aqueous medium outflow from the cell. (For further details on the chromate-removal mechanism, see "Chromate Removal from Cooling Tower Blowdown by Reaction with Electrochemically Generated Ferrous Hydroxide," *Journal of Environmental Science and Technology*, Vol. 7, No. 4, April, 1973).

Various techniques have been used to recover the above-mentioned suspended precipitate from the aqueous medium withdrawn from the electrochemical cell. Hitherto, the most satisfactory techniques have been sedimentation or filtration, but neither of these techniques has proved to be efficient. Sedimentation involves undesirably long settling times, filtration is not well suited to the removal of such small particles unless the filters are replaced frequently. Thus, separation of the precipitate has posed a continuing problem and has restricted application of the overall process.

SUMMARY OF THE INVENTION

Accordingly, it is an object of this invention to provide an improved electrochemical process for the removal of metal-ion contaminants from aqueous media by reduction and precipitation at an iron anode.

It is another object to provide an improved precipitate-removal technique for such a process.

It is another object to provide an improved electrochemical process for removing chromate from cooling-tower blowdown, the improved process utilizing certain constituents of the blowdown itself to promote removal of a mixed iron hydroxide and chromium hydroxide precipitate.

This invention can be summarized as follows: an improved process for the electrochemical removal of a metal-ion contaminant from the aqueous blowdown from a cooling tower comprising introducing said blowdown to an electrolytic cell including an anode having a surface of a material selected from the group consisting of iron, iron alloys and insoluble compounds of iron and including a cathode; passing through said blowdown in said cell an electric current established between said anode and cathode to form a suspension of a mixed precipitate of iron hydroxide and a hydroxide of said contaminant while evolving gaseous hydrogen at said cathode; establishing above said blowdown in said cell a partial pressure of hydrogen so evolved exceeding atmospheric pressure, thus entraining most of the evolved hydrogen as bubbles in said blowdown in said cell; introducing the resulting hydrogen-rich blowdown containing said suspension into a vented chamber, whereby hydrogen so entrained dissolved in said blowdown forms bubbles which combine with particles of said precipitate to form a precipitate-containing froth; and separating said froth from said blowdown.

BRIEF DESCRIPTION OF THE DRAWING

The single FIGURE is a schematic diagram of apparatus for carrying out the process of this invention.

DESCRIPTION OF THE PREFERRED EMBODIMENT

This invention is generally applicable to electrochemical processes which accomplish the removal of metal-ion contaminants from aqueous media and which employ an iron anode for the reduction and precipitation of the contaminants. (By "iron anode" is meant an anode having a surface of iron, an iron alloy, or an insoluble iron compound.) For brevity, the invention will be illustrated chiefly as applied to the removal of hexavalent chromium (e.g., $CrO_4^=$ or $Cr_2O_7^=$ ions) from water which has been discharged, or blown down, from a cooling tower.

Referring to FIG. 1, the numeral 1 designates a conventional cooling tower incorporated in a recirculating-water system (not shown). In accord with common practice, the recirculating water contains both hexavalent chromium (derived from a soluble alkali-metal chromate corrosion inhibitor) and an organic dispersing agent for inhibiting the growth of various hydrophilic organisms on cooling-tower surfaces and/or preventing the deposition of insoluble particulates. The following are examples of organic dispersing agents commonly used for this purpose: N-alkyl ($c_{12}$–5%, $C_{14}$60%, 60%, $C_{16}$–30%, $C_{18}$–5%) dimethyl benzylammonium chloride, ethylhexadecyldimethylammonium bromide, and other quaternary ammonium compounds. As shown, the cooling tower is provided with piping 3 for conveying blowdown to an electrochemical cell 4 containing two sets of low-carbon steel plates which are connected to different output terminals of an alternating-current power supply. The sets of plates alternately serve as sacrificial iron anodes for generating $Fe(OH)_2$, which reduces the Cr(VI) to Cr(III), forming a mixed chromium hydroxide and iron hydroxide precipitate of very fine particle size. Hydrogen is evolved continuously as a cathode reaction.

In accordance with this invention, operation of the electrochemical cell 4 is conducted in a novel manner promoting subsequent efficient removal of the precipitate from the blowdown. In the new mode of operation, hydrogen evolved at the cathodes is not vented from the cell but instead is retained therein to establish above the blowdown (electrolyte) a partial pressure of evolved hydrogen exceeding atmospheric pressure. This may be accomplished most conveniently by conducting the electrolytic operation in a closed (unvented) cell or, if desired, employing conventional pressure-regulating means to maintain a selected gas pressure above the electrolyte by releasing a selected fraction of the evolved hydrogen. As a result, most of the hydrogen being evolved in the cathode reaction remains in the cell electrolyte as entrained bubbles. The resulting hydrogen- and precipitate-containing electrolyte is withdrawn and introduced to a vented or lower-pressure flotation chamber 5, where the hydrogen bubbles adhere to the fine particles of the precipitate, forming a precipitate-laden froth which rises to the surface of the liquid. If the above-mentioned organic dispersion is present in the cooling-tower water, it promotes flotation of the precipitate. Furthermore, in the normal course of operation of a recirculating-cooling-water system the water is circulated continuously over the cooling-tower structure, where it becomes cooled and saturated with air because of the intimate mixing of air with the droplets of water in falling through the tower. This air in the blowdown water is released in the form of small bubbles in the electrochemical cell, where heating of the water normally occurs. Many of these bubbles of air attach themselves to the finely divided precipitate, thus aiding its flotation. The resulting precipitate-laden froth is separated from the liquid in any suitable manner, as by directing it or skimming it into a suitable collector while separately withdrawing the purified liquid for subsequent use or disposal.

This new mode of operation provides important and valuable advantages over the conventional process described above. First, it accomplishes more efficient separation of the suspended contaminant because flotation capitalizes on the very small particle size of the precipitate, whereas that same particle size has been an obstacle to efficient separation in the process as previously conducted. Second, in the new mode of operation flotation of the mixed hydroxide precipitate is accomplished very conveniently and at significantly reduced cost by effecting flotation with hydrogen and air, which in the past have been vented from the cell as waste. Both hydrogen and air are extremely buoyant in water and are highly effective flotation agents for the precipitate. Since both are present as waste products in the process, they are the most economical and convenient flotation agents possible. Third, the new process provides a further advantage in that it utilizes as a flotation promoter (e.g., as a collector-frother) the above mentioned dispersing agent (or any other surfactant) typically employed in excess in recirculating-water systems and present as waste in the system blowdown.

If desired, separation of the precipitate in accordance with this process can be further enhanced by introducing to the flotation chamber any additional suitable flotation promoter, such as a collector, frother, or collector-frother. The promoter might, for example, be an anionic surfactant—such as sodium dodecylsulfate, fatty acids, long-chain sulfonates, or amines—or a cationic surfactant, such as ethylhexadecyltrimethyl ammonium bromide, dodecylammonium acetate, or naphthalene-sulfonic acid. The additional promoter introduced to the flotation chamber may be added directly thereto or it may be added to the blowdown at some earlier point in the process. The improved process can be conducted in any suitable electrochemical cell. The flotation tank 5 may be of conventional design and, if desired, may be disposed within or about the cell 4.

While this invention has been illustrated above in terms of the removal of chromate from blowdown, it will be understood that it also is applicable to the removal of other ionic contaminants which are reduced and precipitated at an iron anode as described. The following are a few examples of such other contaminants: zinc, magnesium, lead, cadmium, calcium, and arsenic. It will be apparent to those versed in the art that various other modifications may be made in the improved process without departing from the scope of the invention as defined in the appended claims.

What is claimed is:

1. An improved process for the electrochemical removal of a metal-ion contaminant from the aqueous blowdown from a cooling tower comprising:
   a. introducing said blowdown to an electrolytic cell including an anode having a surface of a material selected from the group consisting of iron, iron alloys, and insoluble compounds of iron and including a cathode;
   b. passing through said blowdown in said cell an electric current established between said anode and cathode to form a suspension of a mixed precipitate of iron hydroxide and a hydroxide of said contaminant while evolving gaseous hydrogen at said cathode;
   c. establishing above said blowdown in said cell a partial pressure of hydrogen so evolved exceeding atmospheric pressure, thus entraining most of the evolved hydrogen as bubbles in said blowdown in said cell;
   d. introducing the resulting hydrogen-rich blowdown containing said suspension into a vented chamber, whereby the hydrogen so entrained combines with particles of said precipitate to form a precipitate-containing froth; and
   e. separating said froth from said blowdown.

2. The process of claim 1 wherein said partial pressure is established by retaining within said cell all of the evolved hydrogen accumulating above the blowdown therein.

3. The process of claim 1 wherein said partial pressure is established by releasing from said cell a selected fraction of the evolved hydrogen accumulating above the blowdown therein.

4. The process of claim 1 wherein a flotation promoter for said precipitate is introduced to said vented chamber.

5. An improved method for the electrochemical removal of hexavalent chromium contaminant from the blowdown from a cooling tower incorporated in a recirculating-water system, said blowdown containing a surfactant added to the recirculating-water system to promote efficient operation thereof, said blowdown being saturated with air as a result of having been passed through said cooling-tower, comprising:
   a. introducing said blowdown to an electrolytic cell including an anode having a surface of a material selected from the group consisting of iron, iron alloys, and insoluble compounds of iron and including a cathode;
   b. passing through said blowdown in said cell an electric current established between said anode and cathode to form a suspension of a mixed precipitate of iron hydroxide and chromium hydroxide while evolving gaseous hydrogen at said cathode;
   c. establishing above said blowdown in said cell a partial pressure of hydrogen so evolved exceeding atmospheric pressure, thus entraining most of the evolved hydrogen as bubbles in said blowdown in said cell;
   d. introducing the resulting hydrogen-rich blowdown containing said suspension and said surfactant into a vented chamber, whereby the hydrogen so entrained and air entrained in the introduced blowdown combine with particles of said precipitate to form a chromic-hydroxide-containing froth; and e. separating said froth from said blowdown.

6. The process of claim 5 wherein said partial pressure is established by retaining within said cell all of the evolved hydrogen accumulating above the blowdown therein.

7. The process of claim 5 wherein said partial pressure is established by releasing from said cell a selected fraction of the evolved hydrogen accumulating above the blowdown therein.

8. The process of claim 5 wherein a flotation promoter in addition to said surfactant is introduced to said vented chamber.

* * * * *